United States Patent [19]

Suda

[11] Patent Number: 5,152,938

[45] Date of Patent: Oct. 6, 1992

[54] PROCESS FOR PREPARATION OF A WHOLLY CARBONACEOUS DIAPHRAGM FOR ACOUSTIC EQUIPMENT USE

[75] Inventor: Yoshihisa Suda, Maebashi, Japan

[73] Assignee: Mitsubishi Pencil Co., Ltd., Japan

[21] Appl. No.: 466,477

[22] Filed: Jan. 17, 1990

[30] Foreign Application Priority Data

Jan. 20, 1989 [JP] Japan .................................... 1-9976

[51] Int. Cl.$^5$ ..................... C01B 31/02; C01B 31/04
[52] U.S. Cl. .................................. 264/29.1; 264/344;
423/448; 423/449.1
[58] Field of Search ................... 264/29.1, 29.5, 29.6,
264/29.7, 234, 344, 345; 423/445, 448, 449;
524/100, 101, 495, 496, 567, 568, 750;
525/331.5, 331.6, 350.351, 375

[56] References Cited

FOREIGN PATENT DOCUMENTS 59-191779 10/1984 Japan ................................ 423/448
61-151282 7/1986 Japan .

Primary Examiner—Leo B. Tentoni
Attorney, Agent, or Firm—James A. Wong

[57] ABSTRACT

A process for preparing a wholly carbonaceous diaphragm includes blending a powder of graphite with a chlorine-containing resin and a monomer or a primary condensate of a thermosetting resin containing a triazine ring; adding thereto a solvent or a plasticizer capable of dissolving these resin components; thoroughly kneading the resulting mixture so that crystals of graphite cleft and binder resin are allowed to disperse with strong affinity, whereby a resulting composition is made into a sheet-form in which the crystal surfaces of graphite are oriented to a high degree; further passing the sheet-form through a calendering roll to preform it into a film or a sheet; then forming these materials into a shape of a diaphragm in heated air to remove the solvent or plasticizer, and to produce a completely cured body causing no thermal deformation by promoting cross linking reaction and curing reaction of the chlorine-containing resin by triazine; and then baking the cured body in an inert atmosphere.

1 Claim, No Drawings

PROCESS FOR PREPARATION OF A WHOLLY CARBONACEOUS DIAPHRAGM FOR ACOUSTIC EQUIPMENT USE

BACKGROUND OF THE INVENTION

Field of the Invention

The present invention relates to a process for preparation of a wholly carbonaceous diaphragm for acoustic equipment use. More particularly this invention relates to a process for preparation of a wholly carbonaceous diaphragm which is suited for the age of digital audio from the various viewpoints such that as compared with the conventional diaphragms it is surpassingly light in weight and highly elastic as the diaphragm for speaker, headphone or microphone use; and because of the large velocity of the propagation of sound and moreover the excellent rigidity its deformation due to external forces is very little, with the distortion of sound being small and the sound range being broad, so that it can emit a sound of clear tone quality.

Prior Art

As the conventional diaphragms use has been made of those which are obtained by compounding glass fibers or carbon fibers with paper (pulp), plastic, or their raw materials, as the basic material, or those which are obtained by processing metals such as aluminum, titanium, magnesium, beryllium, boron, etc., or alloys thereof, or the raw materials such as nitrides, carbides, borides, etc. However, paper, plastic, and the compounded raw materials thereof are small in the ratio of Young's modulus to density, and hence the velocity of sound is slow causing split vibration at a specific mode, and the frequency characteristics are markedly lowered especially in the high frequency wave region, so that it is difficult to obtain clear tone quality.

In addition to the above, there are defects such that it is not only liable to be influenced by the external circumstances such as temperature, humidity, etc. but also susceptible to qualitative degradation and fatigue on standing of the material, which cause the lowering of the characteristics. On the other hand, when in use of metallic disks of aluminum, titanium, magnesium, etc., although the velocity of sound is fast showing excellent properties as compared with paper, plastic, etc., the velocity of sound is not as yet sufficiently fast, and the internal loss is also small, so that there are defects such that a sharp resonance phenomenon takes place in the high frequency wave region, or fatigue on standing such as creep, or the like, of the material is brought about to lower the characteristics. Although beryllium and boron are ideal materials having excellent physical constants, they are highly expensive because of scantiness in natural resource, and industrially their processing is considerably difficult.

Besides the above, by paying attneiton to carbon materials, there has been developed a wholly carbonaceous diaphragm for acoustic equipment use.

Among the wholly carbonaceous diaphragms heretofore obtained, those which are obtained without orienting to a high degree the highly elastic material that is the important element for exhibiting a high velocity of sound are found to be difficult to realize the high velocity of sound. Also, those which are obtained by molding only a high elastic material blended with a binder not only require a lot of time in the treatment for making the carbon precursor but also are liable to cause deformation or distortion of the baked product. On the other hand, the process for preparation of the carbon diaphragms by CVD, or the like, is not suited for mass production, and moreover the manufacturing step is complicated and a high velocity of sound can hardly be attained.

The object of this invention is to provide a process for preparation of a wholly carbonaceous diaphragm for acoustic equipment use, which is free from these problems.

The present inventors, in view of the above-described defects heretofore encountered, made an extensive investigation in order to develop a process for preparation which can produce such a wholly carbonaceous diaphragm capable of exhibiting to the highest degree the functional characteristics of carbon materials, while avoiding complicated steps in the manufacture and especially without injuring the shape of the product when a suitable form is to be given thereto, and as the result the invention of the present application could be achieved.

In the invention of this application, paying special attention to the fact that the crystals of graphite having a high crystallinity are tabular and flat, and its theoretical elastic modulus is 1020 GPa showing an extremely high value as compared with other materials, one creative method was devised in that after a compounded carbon thin film has been prepared by orienting to a high degree the crystals of graphite having a high crystallinity along the direction of the film surface using a resin charcoal as a binder, said carbon thin film is given an optional form. On the other hand, during the research on the material of a binder such that when the carbon material has been given a form, it does not cause deformation, maintaining the form initially given even after baking, it was found out that a product obtained as a blend polymer of a chlorine-containing resin and a thermosetting resin containing a triazine ring can show the behavior of a thermoplastic resin as such when given a form, rendering it possible to be readily processed by thermoplastic molding, whereas as soon as the solvent or plasticizer contained therein is thereafter removed by heating in the air, cross linking reaction and curing reaction take place between the chlorinecontaining resin and the triazine, and then the reaction product becomes insoluble and infusible even by heat and solvent. Moreover, it was also found out that the material for molding thus obtained by compounding the powder of graphite by the use of such a carbonizing binder not only can maintain the form initially given with high precision even after baking but also can exhibit to the highest degree the functional characteristics of carbon materials.

SUMMARY OF THE INVENTION

In accordance with this invention there is provided a process for preparation of a wholly carbonaceous diaphragm for acoustic equipment use, which comprises blending a powder of graphite with a chlorine-containing resin and a monomer or a primary condensate of a thermosetting resin containing a triazine ring, which can promote cross linking by reacting with said chlorine-containing resin component when heated, as the raw material of the carbonizing binder for binding the powder of graphite; adding thereto a solvent or a plasticizer capable of dissolving these resin components; thoroughly kneading the resulting mixture by the use of a mixer having high shearing force so that the crystals of the graphite cleft by the mechanochemical reaction and the binder resin are allowed to disperse with strong affinity, thereby the resulting composition being made into a sheet-form in which the crystal surfaces of graphite have been oriented to a high degree along the direction of the film surface; further passing said sheet-form through a calendering roll to preform into a film or sheet having a desired thickness; treating the preformed film or sheet thus obtained and then molded into a shape of a diaphragm in the heated air so as to remove the solvent or plasticizer contained therein and at the same time to produce a completely cured body causing no thermal deformation by promoting the cross linking reaction and curing reaction of the chlorine-containing resin by triazine; and then baking said cured body in an inert atmosphere.

The preferable chlorine-containing resins are chlorine-containing resins such as polyvinyl chloride resin, polychlorovinyl chloride resin, polyvinyl chloride/vinyl acetate copolymeric resin, chlorinated polyethylene, polyvinylidene chloride, etc.

The preferable thermosetting resins containing a triazine component are thermosetting resins containing a triazine ring such as melamine resin, melamine.urea resin, melamine.phenol resin, melamine.alkyd resin, benzoguanamine resin, bismaleimide triazine resin, etc.

DETAILED DESCRIPTION AND THE PREFERRED EMBODIMENTS

Now, the process for preparation of a wholly carbonaceous diaphragm for acoustic equipment use of the invention of this application will be explained in more detail below.

As the raw material of the carbonizing binder, use is made of a blend polymer which is obtained in such a manner that a chlorine-containing resin and a monomer or a primary condensate of a thermosetting resin containing a triazine ring, which can react with said chlorine-containing resin to cause cross linking when heated, are mixed with a solvent or a comparatively volatile plasticizer and thoroughly kneaded. A mixture of this blend polymer and a powder of graphite having a high crystallinity is thoroughly kneaded by the use of a mixing roll, or the like, exhibiting high shearing force. The fine crystals of graphite cleft by such an operation and the binder resin begin to show strong affinity to each other, so that the dispersion becomes complete and there is obtained a sheet-formed composition in which the fine crystals of graphite cleft have been oriented to a high degree parallel to the direction of the film surface. By passing the sheetformed composition through a calendering roll a preformed body for molding is obtained in the form of a film or a sheet having a desired thickness.

The preformed body thus obtained is molded into a shape of a desired disk by a hot press molding process, a vacuum molding process, a blow molding process, etc. When the molded product is withdrawn from the mold and then heated in an air oven, the solvent and plasticizer contained therein are volatilized and at the same time the cross linking reaction and curing reaction of the chlorine-containing resin by triazine are completed, thereby forming a baking precursor which is never deformed thereafter even by heat. It is baked by heating in an inert gas phase such as nitrogen argon, etc. The wholly carbonaceous diaphragm obtained in this way not only maintained the shape initially given by molding with high precision but also exhibited the functional characteristics of carbon materials to the highest degree.

Now, concerning the raw material of the carbonizing binder used in the present invention, as the chlorine-containing resins there are polyvinyl chloride resin, chlorinated vinyl chloride resin, polyvinyl chloride/vinyl acetate copolymeric resin, polyvinylacetal resin, chlorinated polyethylene resin, polyvinylidene chloride resin, etc., and as the thermosetting resins containing a triazine ring there are meramine, melamine.urea resin, melamine phenol resin, melamine alkyd resin, benzoguanamine resin, bismaleimide triazine resin, etc.

Further, as the powder of graphite having a high crystallinity there are natural scaly graphite, Kish graphite, pyro graphite, etc.

With reference to Examples this invention will be explained more fully below.

EXAMPLE 1

After 30 parts by weight of chlorinated vinyl chloride (produced by Nippon Carbide Industries Co., Ltd., average degree of polymerization 680), 30 parts by weight of bismaleimide triazine resin (produced by Mitsubishi Gasu Kagaku Co., Ltd.), and 22 parts by weight of diallyl phthalate as a plasticizer were mixed in a Henschel mixer, there was added to the resulting mixture 40 parts by weight of natural scaly graphite (average particle size 7 microns) and again mixed in a Henschel mixer.

Then, the mixture thus obtained was thoroughly kneaded by means of a pressurized kneader and a two roll mill, whereby the crystals of graphite and the binder resin became a dispersion with strong affinity and formed a sheet in which the crystal surfaces of graphite have been oriented to a high degree along the direction of the film surface of the sheet. After the sheet had been passed through a calendering roll to be made into a film of 120 microns in thickness, the film obtained was molded into a dome shape of 60 mm$\phi$ by the use of a vacuum molding machine.

By heating the molded body thus obtained up to 250° C. in an air oven, the plasticizer could be removed completely and at the same time there was obtained a baking precursor in which the cross linking reaction and curing reaction had been completed.

Next, by heating the precursor in an atmosphere of nitrogen gas at a heating velocity of 40° C./h. up to 500° C. and at 100° C./h. between 500°–1000° C., there was obtained a wholly carbonaceous diaphragm.

The diaphragm obtained as above showed no deformation in the shape and the characteristics were as follows.

| | |
|---|---|
| Film thickness | 50 microns |
| Dome size | 58 mm$\phi$ |
| Density | 1.70 g/cm$^3$ |
| Young's modulus | 248 GPa |
| Velocity of sound | 12080 m/sec. |
| Internal loss | 0.045 |

EXAMPLE 2

After 30 parts by weight of vinyl chloride/vinyl acetate copolymeric resin (produced by Nippon Zeon Co., Ltd., average degree of polymerization 800), 20 parts by weight of melamine.phenol resin (produced by Fuji Kasei Co., Ltd.), and 20 parts by weight of dibutyl phthalate as a plasticizer were mixed in a Henschel mixer, there was added to the resulting mixture 50 parts by weight of Kish graphite (average particle size 4 microns), and again mixed in a Henschel mixer.

Then, by processing through the same steps as in Example 1 there was obtained a film having a film thickness of 100 microns. The film thus obtained was molded into a semi-dome shape of 40 mmφ by the use of a vacuum molding machine, and thereafter subjected to the same treatment as in Example 1 to obtain a wholly carbonaceous diaphragm, which showed no deformation in the shape and had the following characteristics.

|  |  |
|---|---|
| Film thickness | 30 microns |
| Semi-dome size | 38 mmφ |
| Density | 1.69 g/cm$^3$ |
| Young's modulus | 240 GPa |
| Velocity of sound | 11900 m/sec. |
| Internal loss | 0.043 |

What is claimed is:

1. A process for preparation of a wholly carbonaceous diaphragm for acoustic equipment use, which comprises blending a powder of graphite with a chlorine-containing resin and a primary condensate of a theromsetting resin containing a triazine ring, which can promote cross linking by reacting with said chlorine-containing resin component when heated, as raw material of a carbonizing binder for binding said powder of graphite; adding thereto a solvent or a plasticizer capable of dissolving these resin components; thorougly kneading a mixture resulting by use of a mixer having high shearing force so that crystals of graphite cleft by mechanochemical reaction and binder resin are allowed to disperse with strong affinity, thereby resulting in a compositionb eing made into a sheet-form in which rystal surfaces of grpahite have been oriented to a high degree along a direction of film surface; further passing said sheet-form through a calendering roll to preform it into a film or a sheet having a desired thickness; subjecting the film or sheet thus preformed in heated air and then molded into a shape of a diaphragm in heated air so as to remove the solvent or plasticizer contained therein and at the same time to produce a completely cured body by promoting cross linking reaction and curing reaction of the chlorine-containing resin by triazine; and then baking said cured body in an inert atmosphere, wherein said thermosetting resin containing a triazine component is a thermosetting resin containing a triazine ring selected from the group consisting of melamine resin, melamine urea resin, melamine phenol resin, melamine alkyd resin, benzoguanamine resin, and bismaleimide-triazine resin.

* * * * *